Figure 8:
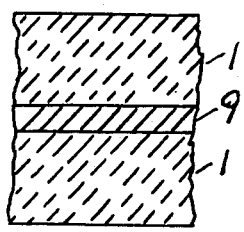

United States Patent [19]

Marshall

[11] 4,189,760

[45] Feb. 19, 1980

[54] MONOLITHIC CAPACITOR WITH NON-NOBLE METAL ELECTRODES AND METHOD OF MAKING THE SAME

[75] Inventor: Gilbert L. Marshall, Erie, Pa.

[73] Assignee: Erie Technological Products, Inc., Erie, Pa.

[21] Appl. No.: 563,640

[22] Filed: Mar. 31, 1975

Related U.S. Application Data

[63] Continuation of Ser. No. 359,635, May 14, 1973, abandoned.

[51] Int. Cl.$^2$ .............................................. H01G 4/12
[52] U.S. Cl. .................................. 361/321; 29/25.42; 264/61
[58] Field of Search ............... 317/258, 261; 29/25.42; 174/68.5; 264/59, 61, 104; 361/321

[56] References Cited

U.S. PATENT DOCUMENTS

| | | | |
|---|---|---|---|
| 2,919,483 | 1/1960 | Gravley | 317/261 X |
| 3,390,012 | 6/1968 | Haberecht | 317/258 X |
| 3,534,238 | 10/1970 | Buehler | 317/258 |
| 3,561,110 | 2/1971 | Feulner | 174/68.5 |
| 3,645,783 | 2/1972 | Rupert | 338/330 |
| 3,679,950 | 7/1972 | Rutt | 317/258 |
| 3,838,204 | 9/1974 | Ahn et al. | 174/68.5 |

*Primary Examiner*—E. A. Goldberg
*Attorney, Agent, or Firm*—Ralph Hammar

[57] ABSTRACT

A monolithic ceramic capacitor having embedded electrodes formed by cosintering of ceramic dielectric layers and layers indifferent to the dielectric layers corresponding in area and position to the electrodes. The indifferent layers are converted to a conductive state, for example, by chemical conversion and used as such or are removed and replaced by metal or conductive material. One example in which the indifferent layers comprise nickel oxide involves stacking layers of green ceramic coated with nickel oxide in the desired electrode pattern, sintering the stacked layers to produce a monolith, reducing the nickel oxide in the monolith to metallic nickel in a hydrogen atmosphere at a temperature low enough to have minimal effect upon the dielectric properties of the ceramic and using the metallic nickel as reduced for the ceramic capacitor electrodes. In another example, after the reduction step (which may be at high temperature) the metallic nickel is dissolved, for example by sulfuric acid, the ceramic monolith is reoxidized by firing in an oxidizing atmosphere such as air, and the voids left by removal of the dissolved metallic nickel are provided with suitable electrodes. In still another example, in which the indifferent layers comprise oxidizable material such as carbon, the stacked layers are sintered in an inert atmosphere to produce a monolith of matured ceramic and the indifferent layers are removed by subsequent firing in an oxidizing atmosphere to produce the voids for receiving conductive electrode material.

15 Claims, 10 Drawing Figures

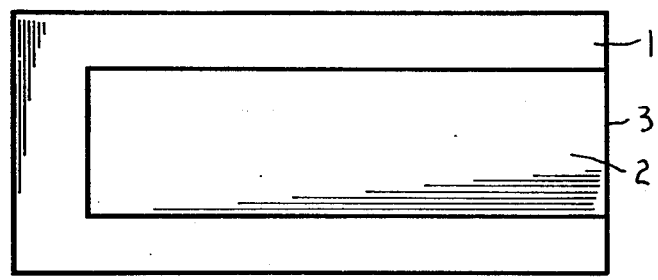
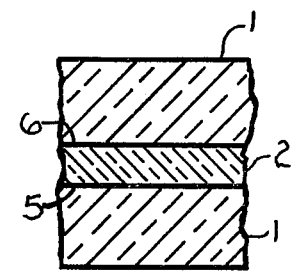
FIG. 1     FIG. 4
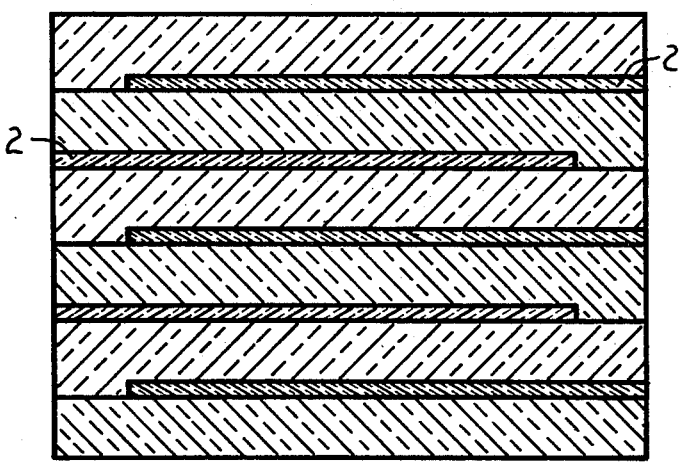
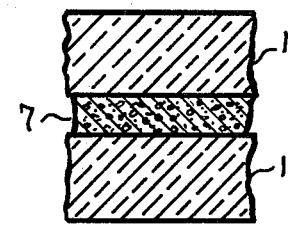
FIG. 5
FIG. 2
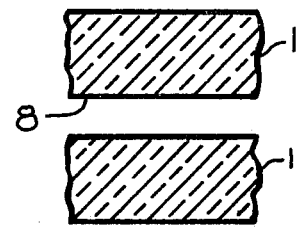
FIG. 6
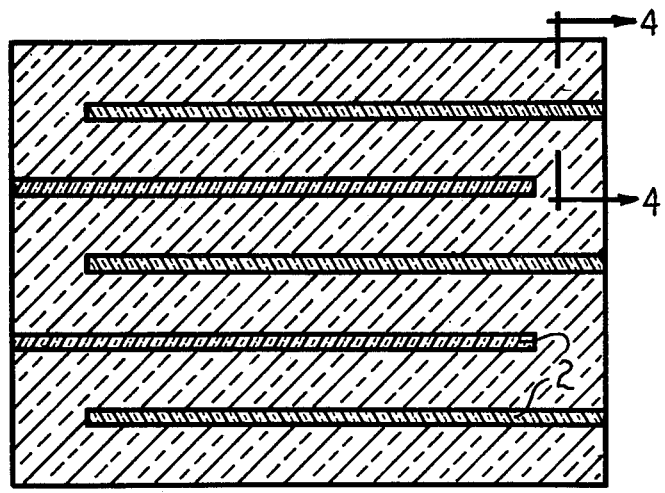
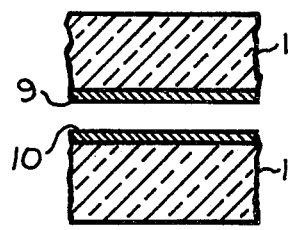
FIG. 7
FIG. 3

MONOLITHIC CAPACITOR WITH NON-NOBLE METAL ELECTRODES AND METHOD OF MAKING THE SAME

This is a request for filing a continuation application under 37 CFR 1.60 of pending prior application Ser. No. 359,635 filed on May 14, 1973 and now abandoned.

This invention is intended to reduce the cost of monolithic ceramic capacitors by eliminating the need for high temperature noble metal electrodes such as platinum, palladium and the like. In lieu of such electrodes, the electrode patterns are made with layers of materials indifferent to the ceramic which can be fired with the ceramic. During firing the ceramic and indifferent layers are consolidated into a dense ceramic monolith. The indifferent material is then changed to conductive electrodes, for example by chemical conversion of the material to a conductive state or by removing the indifferent material and substituting conducting electrode material.

Figure 9:
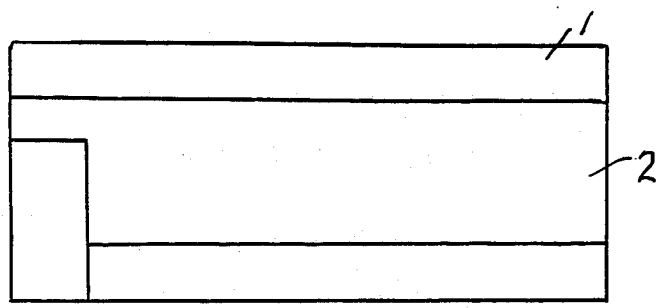
Figure 10:
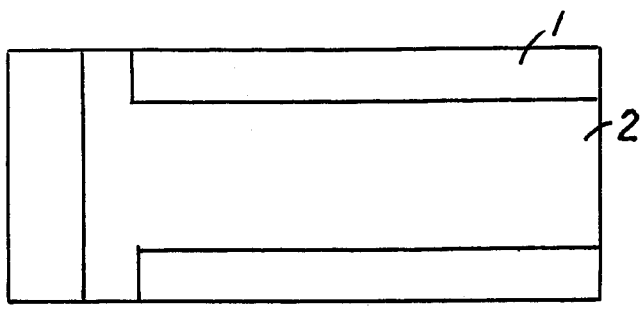

In the drawing,

FIG. 1 is a plan view of one of the ceramic layers used in making the capacitor which has been coated with an electrode pattern of indifferent material, FIG. 2 is a cross sectional view of the layers before firing, FIG. 3 is a similar view after firing, FIG. 4 is an enlarged section on line 4—4 of FIG. 3, FIG. 5 is a view similar to FIG. 4 after reduction of the nickel to the metallic state, FIG. 6 is a view of FIG. 5 after removal of the metallic nickel, FIG. 7 is a view of FIG. 6 after coating of the surface of the voids left by dissolving the metallic nickel with other electrode material such as silver, FIG. 8 is a view similar to FIG. 7 in which the voids are filled with conductive material such as metal, FIG. 9 is a plan view of one of the ceramic layers which has been coated with another electrode pattern of indifferent material, and FIG. 10 is a view like FIG. 9 with still another electrode pattern.

The manufacture of the capacitor starts with a layer, lamina, leaf, stratum or sheet 1 of green ceramic dielectric, for example a high K titanate. Such ceramics consist of mixtures of barium titanate with other oxides, titanates, zirconates, stannates, etc. or precursors thereof. The layer also contains temporary binders and other ingredients which aid in processing. These ceramics are well known to the art and many variations are described in the patent literature. The layer 1 has an electrode pattern, deposit, stratum or layer 2 which extends to one edge 3 and is margined inward from the other edges to provide an insulating border. The layers 1 are stacked one on top of the other with alternate layers turned end for end as shown in FIG. 2. The stacked layers are then pressed together and fired or sintered into a monolith, unitary body or matrix as shown in FIG. 3. The firing temperatures are high, 1000°–1400° C. The thickness of the layer 1 depends on the voltage rating and may be from 1 to 3 mils or more. In the prior art procedures, the electrode patterns have been formed of noble metals such as platinum, palladium, etc. which withstand the high firing temperature in oxidizing atmospheres needed to optimize the properties of titanate dielectrics. Instead of the high temperature metals, the electrode patterns 2 are of a material which remains in place and is indifferent to the ceramic at its sintering temperature and is convertible to a conductive material. For dielectrics which are sintered in air or an oxidizing atmosphere, the indifferent material may be a base metal oxide such as nickel oxide either alone or mixed with compatible metal oxides such as FeO, CoO, MnO, CrO, $V_2O_5$, $SnO_2$, CuO, $Bi_2O_3$, etc. The indifferent material is applied as a paint and the vehicle in which the material is suspended is vaporized or burned during the early stages of the firing. After firing the layer of indifferent mayerial may have a thickness of 2/10 mil or less. If the firing is in an oxidizing atmosphere, the indifferent material may be wholly or partially metal since the oxidizing atmosphere converts the metal to the oxide form. In FIG. 4, which is a diagrammic section of a fired monolith showing a nickel oxide layer 2 sandwiched between two titanate ceramic layers 1, the boundaries 5, 6 between the nickel oxide and the titanate ceramic are sharp and well defined. This monolith is non porous throughout. The ceramic layers are uniformly supported by the nickel oxide layers. Porosity of the nickel oxide layer can be tolerated.

Several procedures are available for converting the monolith at the stage of FIG. 4 to a usable capacitor. FIG. 5 shows the condition of the monolith after being subjected to low temperature reduction in a hydrogen atmosphere. At the low temperature, the hydrogen reduces the nickel oxide to metallic nickel but only slightly reduces the titanate ceramic. For example, at a temperature of 280° C., in 24 hours the nickel oxide is reduced to porous metallic nickel as shown at 7, which forms a good capacitor electrode. At this low temperature there is some reduction of the titanate which affects the dielectric and insulating properties.

The reduction, however, is only partial and is not sufficient to destroy the utility of the capacitor. For example, with a titanate ceramic capacitor dielectric having a normal K of 6000, the low temperature reduction may reduce the K as much as 10 or 15% and also lower the d.c. insulation resistance one order of magnitude which does not impair the use as a capacitor. The power factor also remains at an acceptable 2%. The reduction of the nickel oxide is a time-temperature reaction, the lower the temperature, the longer the time. By adding to the nickel oxide other oxides such as tin oxide in small proportions, 1% or less, the reduction of the nickel oxide to the metallic state at low temperatures can be speeded up or the reduction temperature can be lowered.

Another procedure for converting the monolith of FIGS. 3 and 4 to a usable capacitor is shown in FIGS. 5, 6 and 7. FIG. 5 shows the nickel oxide reduced to porous metallic nickel. Because of the succeeding steps illustrated in FIGS. 6 and 7, there is no need for low temperature reduction so that the reduction is carried out at high temperatures which not only cause the reduction to metallic nickel but also cause reduction of the titanate ceramic to the semiconductor state. After reaching the FIG. 5 state, the metallic nickel is removed by dissolving in a solution indifferent to the ceramic, for example in dilute sulfuric acid. The ceramic body is reoxidized by firing in an oxidizing temperature such as air, restoring the ceramic to the dielectric state having its original dielectric properties. This leaves a void or slot 8 in each location previously occupied by the nickel oxide powder. The slot 8 will ordinarily be a few tenths of a mil thick while the dielectric layers 1 will ordinarily have thicknesses of from one to three or four mils. The manufacture is complete by filling the slots or by coating the surfaces 9, 10 of the slot 8 with suitable electrode material. This, for example, could be silver paint introduced into the slots 8 by capillary action or by a combination of capillary action and pressure. Many conductive paints are known, some consisting of metal pigments which form a conductive coating and others having metal compounds which break down into metallic coating. Fusible metal such as solder may be used as shown in FIG. 8.

The indifferent material 2 is not limited to oxides or chemical compounds. When the monolith is sintered in an inert atmosphere, oxidizable materials such as carbon may be used for the layers 2. Carbon is suspended in a vehicle similar to that used for nickel oxide. After firing in an inert atmosphere to mature the ceramic, refiring in an oxidizing atmosphere will remove the carbon and supply any oxygen deficiency in the dielectric. The voids left by the removal of the carbon may be filled with conductive material as shown in FIGS. 7, 8 as described above.

FIGS. 9 and 10 show layers 1 of green ceramic with electrode patterns 2 of indifferent material which are open at both ends to facilitate filling by eliminating the need for venting air during filling or for evacuating air before filling the voids with liquis conductive material. The layers 1 of FIGS. 9 and 10 may be stacked and processed in the manner shown in FIGS. 1–8.

Although the invention has been described in connection with titanate ceramics, it is advantageous in other ceramic dielectrics, particularly those requiring high firing temperatures which can be withstood only by the high temperature metals such as platinum, palladium, etc. The materials of the electrode pattern 2 should remain in place and be indifferent to the ceramic dielectric at the firing temperature required to mature the ceramic, should not melt or sublime at the firing temperature and should be convertible to a conductive state either by chemical conversion in situ or by removal to provide voids for receiving conductive materials. The indifferent material 2 supports the green ceramic 1 during the initial firing or sintering to mature the ceramic. Thereafter the ceramic is dimensionally stable and does not require such support during the subsequent firing in reducing or oxidizing atmospheres.

By way of example, and not of limitation, carbon, nickel oxide are non-metallic materials.

"Metallic"—of the nature of metal; as a metallic substance, exhibiting the characteristic properties of a metal in the free state (that is, not combined as in oxides or salts); as metallic lead.

"Nonmetallic"—not metallic.

What is claimed is:

1. A monolithic structure comprising:
   a sintered unitary body;
   1. said body having a matrix of a dielectric ceramic composition and
   2. a plurality of vertically spaced nonmetallic strata in said matrix, each stratum extending to one of a pair of edge regions of said body, alternate strata extending to the same edge region, said nonmetallic strata having been positioned in said matrix prior to the sintering of said body and comprising nickel oxide.

2. An intermediate product comprising an as sintered monolith of ceramic dielectric material an one component and a solid non noble metallic oxide material as another component, said non noble material being in the positions and of the shapes and sizes required for electrodes in capacity relation to each other through portions of said dielectric material, said ceramic dielectric material and non noble material having been first positioned in said monolith and then cofired or sintered into said monolith, said ceramic having been matured by said sintering, said non noble material comprising a material which remains solid and in place and is indifferent to the ceramic during said sintering and is a solid metal oxide at the end of said sintering and is reducible in situ to the metallic state after said sintering to provide conductive electrodes.

3. A sintered monolith comprising, ceramic dielectric material and other material embedded in the monolith in the positions required for electrodes in capacity relation to each other through portions of said dielectric said ceramic and other material having been positioned in said monolith as discrete layers in the green state prior to sintering of said monolith and having been cosintered to mature the ceramic, said other material comprising nickel oxide which remains in place and is indifferent to the ceramic during said cosintering and is convertible to a conductive material by chemical reduction after said cosintering.

4. The monolith of claim 3 in which after said sintering the nickel oxide present in the as sintered monolith is reducible in situ to the metallic state to provide capacitor electrodes.

5. A sintered monolith comprising ceramic dielectric material and other material embedded in the monolith in the positions required for electrodes in capacity relation to each other through protions of the dielectric, said ceramic and other material having been positioned in said monolith as discrete layers in the green state prior to sintering of said monolith and having been cosintered to mature the ceramic, said other material comprising nickel oxide which remains in place and is indifferent to the ceramic during said cosintering and is indifferent to the ceramic during said cosintering and is convertible to a conductive material after said cosintering by removing the nickel oxide and substituting conducting electrode material.

6. The monolith of claim 5 in which the nickel oxide is reducible to the metallic state after said sintering and is then dissolvable to remove the same.

7. The method of making a monolithic capacitor without high temperature noble metal electrodes which comprises the steps of superposing layers of green ceramic dielectric material and other material, the other material being in the positions required for electrodes in capacity relation to each other through portions of the dielectric and remaining in place and being indifferent to the dielectric material at the firing conditions to produce a sintered monolith, firing the superposed layers into a sintered monolith in which said other material constitutes discrete layers which are non conductive and comprises nickel oxide which is changed to conductive electrodes by subjecting the sintered monolith to a hydrogen atmosphere at temperatures reducing the nickel oxide to metallic nickel and below temperatures substantially affecting the dielectric properties of the ceramic.

8. The method of making a monolith capacitor without high temperature noble metal electrodes which comprises the steps of superposing layers of green ceramic dielectric material and combustible material, the combustible material being in the positions required for electrodes in capacity relation to each other through portions of the dielectric and remaining in place and being indifferent to the dielectric material at the firing conditions to produce a sintered monolith, firing the superposed layers into a monolith in a non oxidizing atmosphere, and thereafter changing the material to conductive electrodes by burning out the combustible material and substituting conductive material.

9. The method of claim 8 in which the firing atmosphere is inert to said combustible material.

10. The method of claim 8 in which said combustible material is carbon.

11. A sintered, unitary, ceramic body having a plurality of cosintered regions and comprising a plurality of regions of dielectric ceramic composition and at least one region of solid base metal oxide material which remains solid and in place and is indifferent to the ceramic during its sintering and by processing subsequent to said sintering is reducible in situ to the metallic state, the base metal oxide material extending to a region on the outer face of the body.

12. A method of making a capacitor without high temperature noble metal electrodes which comprises the steps of superposing layers of green ceramic dielectric material and solid base metal oxide material, the base metal oxide material being in the position required for electrodes in capacity relation to each other through portions of the dielectric material and remaining solid and in place and being indifferent to the dielectric material at the firing conditions, firing the superposed layers into a monolith, and changing the base metal oxide material to conductive electrodes.

13. A process of providing electrodes or conductors in sintered ceramic bodies which comprises providing sheets of a finely divided insulating or dielectric ceramic composition bonded with a temporary binder, which composition forms a dense layer when fired to sintering temperature, introducing between the sheets a deposit of a combustible composition, the combustible composition being suspended in a vehicle which is eliminated during firing, the combustible composition developing a combustible layer when fired, consolidating a plurality of these sheets and intervening deposits whereby to obtain a self-sustaining body; heating this body to eliminate the vehicle and temporary binder, firing the body to sintering temperature in a non oxidizing atmosphere to produce a sintered monolithic body having regions of dense ceramic material and regions of combustible material, each such region extending to a region on an outer face of the monolithic body; and providing a conductive material in the combustible regions.

14. A process for forming a monolithic capacitor which comprises:
 (a) providing a plurality of thin leaves of finely divided ceramic dielectric composition bonded with a temporary binder, this composition forming a dense layer when fired to sintering temperature;
 (b) providing, between the leaves, layers of a combustible composition suspended in a vehicle, the combustible composition developing a combustible layer when fired in a non oxidizing atmosphere, the layers being so arranged and placed that alternate layers extend to one of two different portions of the leaves while being spaced from the other edge portions thereof;
 (c) forming a stack of the alternated leaves and layers;
 (d) heating the stack to eliminate the temporary binder and vehicle;
 (e) firing the self-sustaining stack to sintering temperature in a non oxidizing atmosphere so as to produce a monolithic body having alternate strata of a dense, dielectric, ceramic composition and of a combustible composition; and
 (f) providing a conductive material in the combustible composition strata.

15. The method of making a monolithic capacitor without high temperature noble metal electrodes which comprises the step of superposing layers of green ceramic dielectric material and other material, the other material being in the position required for electrodes in capacity relation to each other through portions of the dielectric and remaining in place and being indifferent to the dielectric material at the firing conditions to produce a sintered monolith, firing the superposed layers into a sintered monolith in which said other material constitutes discrete layers which are non conductive and comprises nickel oxide which is changed to conductive electrodes by subjecting the sintered monolith to a reducing atmosphere at temperatures reducing the nickel oxide to metallic nickel and below temperatures substantially affecting the dielectric properties of the ceramic.

* * * * *